No. 728,746. PATENTED MAY 19, 1903.
P. W. McCAFFREY.
MEANS FOR PRECIPITATING DISSOLVED METALS.
APPLICATION FILED AUG. 25, 1902.
NO MODEL. 2 SHEETS—SHEET 1.
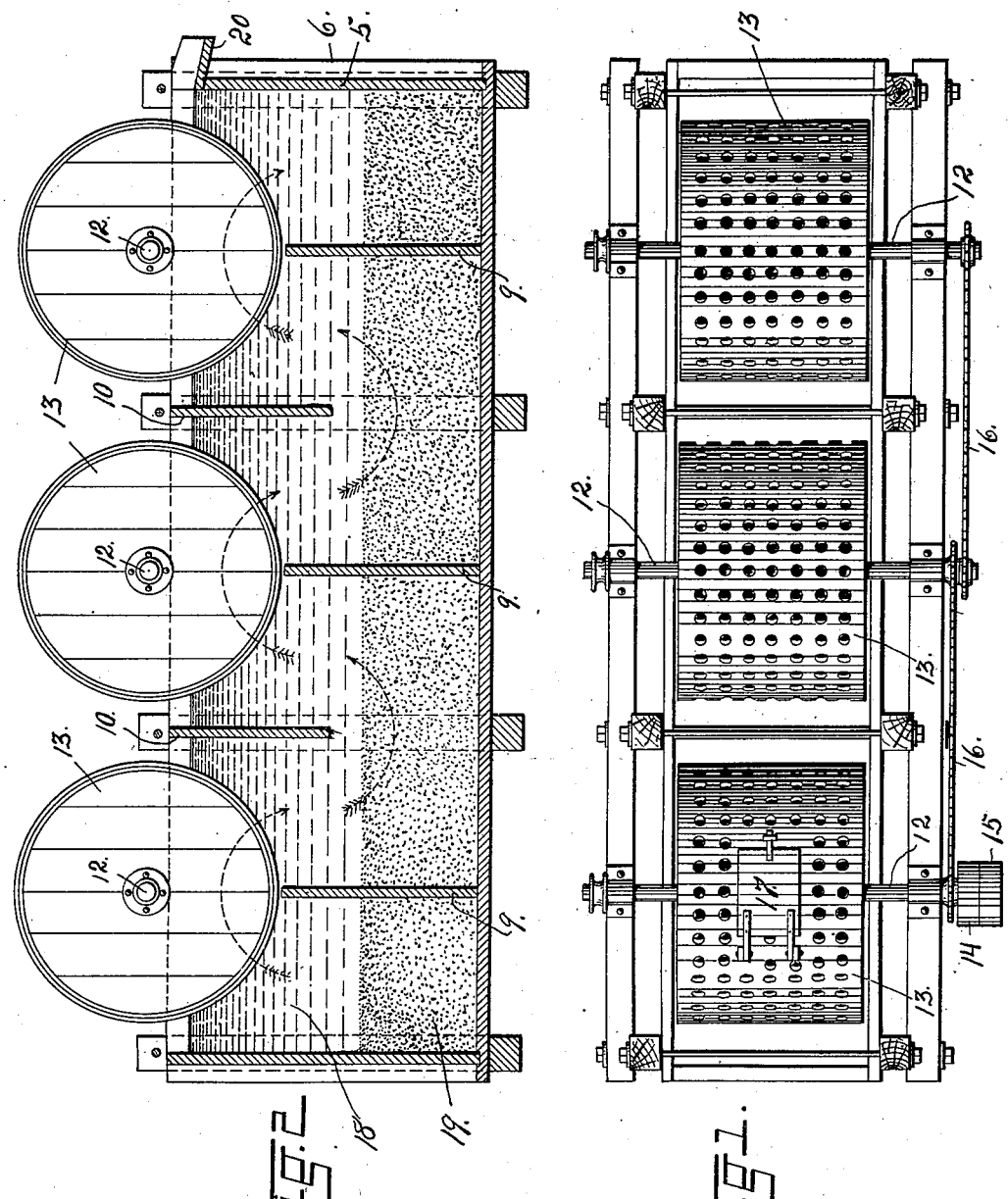

No. 728,746. PATENTED MAY 19, 1903.
P. W. McCAFFREY.
MEANS FOR PRECIPITATING DISSOLVED METALS.
APPLICATION FILED AUG. 25, 1902.
NO MODEL. 2 SHEETS—SHEET 2.
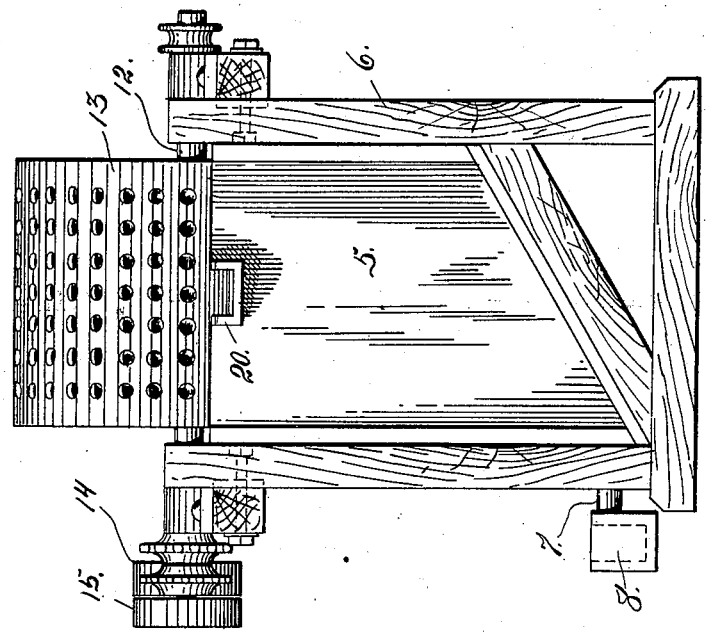
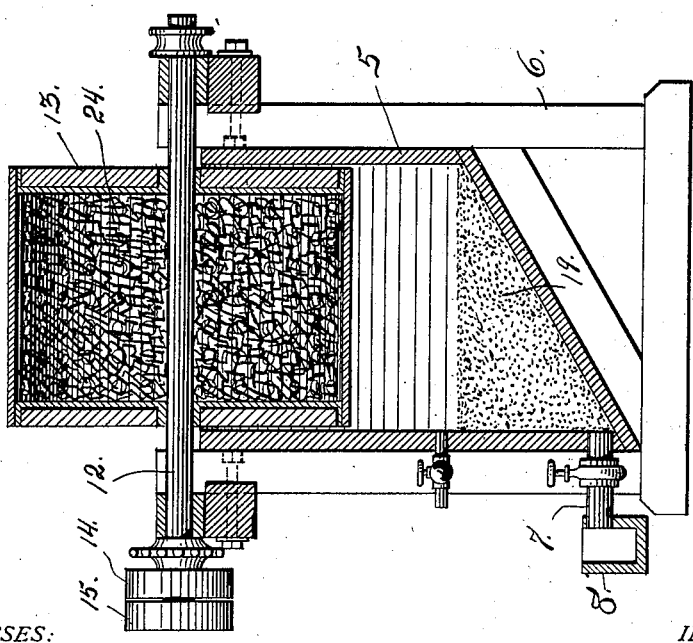
WITNESSES:
Dena Nelson.
Otto E. Hoddick.
INVENTOR.
Peter W. McCaffrey.
BY
ATTORNEY.

No. 728,746. Patented May 19, 1903.

UNITED STATES PATENT OFFICE.

PETER W. McCAFFREY, OF DENVER, COLORADO, ASSIGNOR TO THE UNION ORE EXTRACTION AND REDUCTION COMPANY, OF DENVER, COLORADO.

MEANS FOR PRECIPITATING DISSOLVED METALS.

SPECIFICATION forming part of Letters Patent No. 728,746, dated May 19, 1903.

Application filed August 25, 1902. Serial No. 121,003. (No model.)

*To all whom it may concern:*

Be it known that I, PETER W. McCAFFREY, a citizen of the United States of America, residing at Denver, in the county of Arapahoe and State of Colorado, have invented certain new and useful Improvements in Means for Precipitating Dissolved Metallic Values; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to means for precipitating dissolved metallic values, being especially intended for use in the precipitation of copper in connection with the Gardiner leaching process protected by United States Letters Patent No. 649,296, in which a suitable composition of matter is employed for placing in solution copper-oxid ore. The apparatus, however, may be employed to advantage in connection with any other copper-leaching process in which the precipitation is effected by the aid of iron.

Briefly stated, the apparatus consists of a tank for holding the liquor containing the values in solution, said tank being provided with a number of upwardly-projecting partitions and a number of depending partitions alternately arranged, whereby the solution as it is passed through the tank is compelled to take a zigzag course, perforated cylinders containing scrap metal being mounted to rotate in the solution, the lower portions of the cylinders being close to the upper extremities of the upwardly-projecting partitions, whereby the solution is caused to circulate through the scrap metal in the cylinders as it passes from one compartment to another in the tank. In this apparatus the precipitation is continuous, the liquid containing the values in solution being introduced at one end of the tank and discharged at the opposite end deprived of its values, the latter having been precipitated during the passage of the solution through the tank by coming in contact with the scrap metal in the cylinders.

Having briefly outlined my improved construction, I will proceed to describe the same in detail, reference being made to the accompanying drawings, in which is illustrated an embodiment thereof.

In the drawings, Figure 1 is a top or plan view of my improved continuous-precipitating apparatus. Fig. 2 is a vertical longitudinal section taken through the tank, the cylinders being shown in end elevation. Fig. 3 is a cross-section taken through the tank containing one of the cylinders. Fig. 4 is an end elevation of the apparatus.

The same reference characters indicate the same parts in all the views.

Let the numeral 5 designate a tank, which is mounted on a frame 6. This tank, as shown in the drawings, is rectangular in plan view, provided with vertical sides and a bottom sloping downwardly toward a valved outlet 7, through which the precipitates may be drawn off into the trough 8. In this tank are located a number of vertical partitions 9, resting on the bottom of the tank and projecting upwardly a suitable distance. Mounted also in the tank between its vertical side walls are the depending partitions 10, which are located intermediate the partitions 9. The lower extremities of the partitions 10 project below the upper extremities of the partitions 9 and terminate about as far above the bottom of the tank as the upper extremities of the partitions terminate below the top of the tank.

Journaled in the frame, directly above the partitions 9, are horizontal shafts 12, upon which are mounted and made fast perforated copper cylinders 13, which are filled with scrap-iron 24 and partially immersed in the solution. The lower part of each cylinder is directly above and close to the top of an upright partition 9, while there is a depending partition 10 located between each two cylinders. One of the shafts 12 is provided with fast and loose pulleys 14 and 15 to permit the rotation of the same from a suitable line-shaft or motor. The other shafts are operated from the pulley-shaft by means of sprocket-gears composed of chains 16 and suitable sprocket-wheels mounted on the shafts.

Each cylinder is provided with a door 17 for the insertion of the scrap-iron. The door of but one cylinder is shown. When the apparatus is in operation, the cylinders are rotated and the liquid 18, containing the copper in solution, is fed into the left-hand extremity of the tank, referring to Figs. 1 and 2. This liquor in passing through the tank takes the course indicated by the arrows in Fig. 2, passing above the upwardly-projecting partitions and below the downwardly-projecting partitions, whereby it is caused to pass through the scrap-iron in the cylinders, and finally overflows at the discharge-chute 20, located at the right-hand extremity of the tank.

The foregoing detail description has special reference to the precipitation of copper, in which event the cylinders are filled with scrap-iron. In the precipitation of other values other scrap metal may be required. Hence the invention is not limited to cylinders containing scrap-iron.

The term "scrap metal" as used in this specification is intended to cover metal which is sufficiently finely divided to expose to the action of the liquid a considerable area of surface and which at the same time will be sufficiently loose in the cylinders to permit the liquid to circulate freely therethrough.

Having thus described my invention, what I claim is—

1. In precipitating means, the combination of a tank adapted to hold the liquor from which the precipitation is to be made, upwardly-extending partitions located in said tank, a number of perforated cylinders containing scrap metal, said cylinders being mounted to rotate in said tank which is constructed to receive solution at one end and discharge it at the opposite end above the lowest part of the cylinders, the latter being arranged in successive order from the feed to the discharge extremity of the tank, and partially immersed in the solution, whereby the latter passes from one cylinder to another and through the scrap metal in each, until practically all of the values are precipitated.

2. In copper-precipitating apparatus, the combination of a tank adapted to hold the solution, upwardly-projecting partitions located in said tank, depending partitions, located intermediate the upright partitions and whose lower extremities terminate below the upper extremities of the upwardly-projecting partitions, and perforated cylinders containing scrap-iron, said cylinders being mounted to rotate in said tank whereby they are partially immersed in the solution, the said cylinders being located directly above the upper extremities of the upwardly-projecting partitions and close to said extremities, the tank being constructed to receive the solution at one end and discharge it by an overflow at the opposite end, the discharge being above the lowest part of the cylinders, whereby the solution is caused to pass through the scrap-iron in all the cylinders before leaving the tank, substantially as described.

3. In copper-precipitating apparatus, the combination of a tank adapted to hold the solution, said tank being rectangular in plan view, upwardly-extending partitions located in said tank, and a number of perforated cylinders containing scrap-iron, said cylinders being mounted to rotate in said tank, the length of the cylinders being such that their extremities are located as close to the sides of the tank as is practicable in order to permit perfect freedom of rotation, the tank being constructed to receive solution at one end and discharge it at the opposite end above the lowest part of the cylinders, in order to carry on the precipitating process by a continuous operation, the cylinders being arranged in successive order from the feed extremity to the discharge extremity of the tank, and partially immersed in the solution, whereby the latter is made to pass from one to another and through the scrap-iron in each, until practically all of the copper has been precipitated.

4. In precipitating means, the combination of a tank adapted to hold the liquor from which the precipitation is to be made, a number of perforated cylinders containing scrap metal, said cylinders being mounted to rotate in said tank which is constructed to receive solution at one end and discharge it at the opposite end above the lowest part of the cylinders, the latter being arranged in successive order from the feed to the discharge extremity of the tank and partially immersed in the solution, and suitable means for producing a current of liquid through the tank from end to end, whereby the contact of the liquid with the scrap metal in the tanks is facilitated.

In testimony whereof I affix my signature in presence of two witnesses.

PETER W. McCAFFREY.

Witnesses:
  DENA NELSON,
  A. J. O'BRIEN.